United States Patent

[11] 3,629,897

| [72] | Inventor | Dario Arman<br>Strada Comunale Druento Venaria Druento 10040, Torino, Italy |
|---|---|---|
| [21] | Appl. No. | 855,222 |
| [22] | Filed | Sept. 4, 1969 |
| [45] | Patented | Dec. 28, 1971 |
| [32] | Priority | Apr. 23, 1969 |
| [33] | | Italy |
| [31] | | 51551 A/69 |

[54] CONNECTION MEANS FOR WINDSHIELD WIPER BLADE
4 Claims, 7 Drawing Figs.

[52] U.S. Cl. .................................................. 15/250.32
[51] Int. Cl. .................................................. A471 1/00

[50] Field of Search........................................... 15/250.31, 250.32, 250.33

[56] References Cited
UNITED STATES PATENTS

| 3,056,160 | 10/1962 | Oishei | 15/250.32 |
| 3,071,798 | 1/1963 | Okleja | 15/250.32 |

*Primary Examiner*—Robert W. Jenkins
*Attorney*—Clario Ceccon

ABSTRACT: A box-shaped element, attached to an oscillating, U-shaped support, releasably holds an automotive wiper blade by means of a laminar plate that straddles on a retention seat formed on a box-shaped element and secured thereto by means of a hooked terminal.

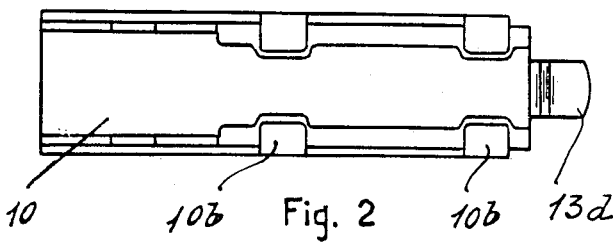
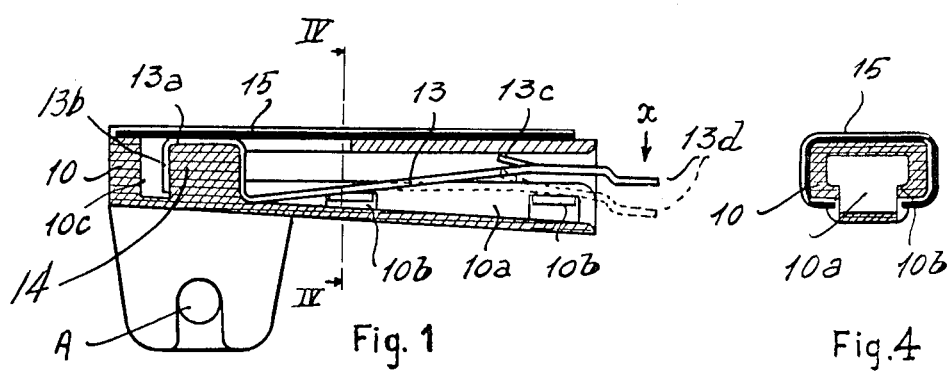
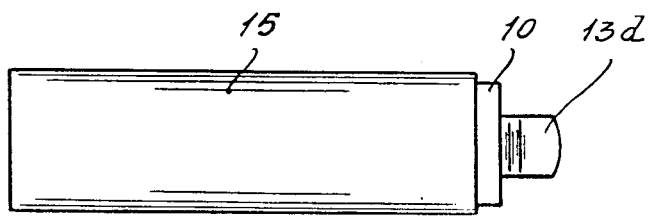
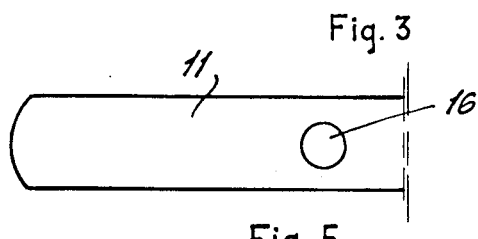
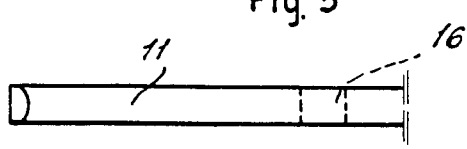
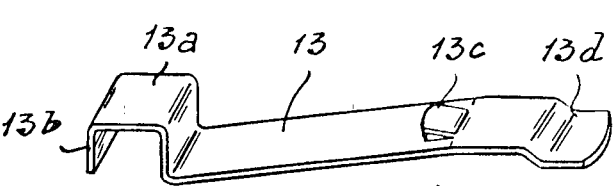

CONNECTION MEANS FOR WINDSHIELD WIPER BLADE

This invention relates generally to windshield wipers and, more particularly, to an improvement in an attachment that forms the releasable connection between the end of the oscillating arm and the back support of a windshield wiper blade in motor vehicles in general.

A method of improving the functioning and operation of the attachment connecting the oscillating arm and the back support of windshield wiper blades for motor vehicles and the like has been disclosed in my copending U.S. Pat. application Ser. No. 781,544, filed on Dec. 5, 1968, which is incorporated herein for reference.

In that copending application, the invention resided in that the connection and coupling between the oscillating arm and the back support of the wiper blade was effected by means of a laminar or platelike spring which had one end folded and anchored in the cavity of the back support, the body of such support being somewhat resilient so as to overcome possible operational scraping noises.

The object of the present invention is a further improvement in the back support of the windshield wiper blade. The resilient laminar element or plate internally mounted in the boxlike body of the back support, instead of being anchored in a cavity thereof, engages directly, due to its substantially hooked or folded end or terminal, a corresponding retention seat upon which it straddlingly rests.

A further object of the present invention resides in the reinforcement afforded by a metallic rodlike sheath to the hollow seat of the terminal of the oscillating arm of the wiper.

These and other objects and advantages of the invention will become apparent from the following detailed description thereof and from the accompanying drawings, in which:

FIG. 1 is a longitudinal sectional view of the invention, showing the boxlike connecting element of the wiper, connected to the back support of the blade;

FIG. 2 is a bottom view of the previous FIG. 1;

FIG. 3 is a top view of the same FIG. 1;

FIG. 4 is a vertical cross-sectional view of FIG. 1, taken along lines IV-IV;

FIGS. 5 and 6 are plan and side views, respectively, of the extremity of the oscillating arm connectable with the boxlike element shown in FIGS. 1–4; and FIG. 7 is a perspective view of the laminar spring used with the boxlike element of the device.

Referring now to the drawings, element 10 is pivotably connected to the back of the wiper blade at A. Element 10 is generally channel-shaped or U-shaped and receives in its cavity 10a and extremity 11 of the oscillating arm.

The coupling between element 10 and the extremity 11 of the arm must be readily achievable and, at the same time, must result in a safe and sufficiently rigid connection so as not to permit play between the coupled elements and to be relatively free from self-disconnection.

In accordance with the present invention, in order to prevent even the slightest play of the resilient laminar plate employed for obtaining the required coupling pressure between the coupled elements, there is mounted within the box-shaped housing 10 a resilient plate 13 which has the extremity 13a hook-shaped for engaging the corresponding seat 14 provided in the end portion of element 10. This seat 14 is formed like a transverse bridge upon which is straddling the extremity 13a of the laminar element 13.

As clearly shown in FIGS. 1–3, the housing 10 is provided with a first longitudinal cavity 10a limited by the transverse bridge 14 and with a second cavity 10c within which is seated the terminal tooth 13b of the resilient laminar plate 13. As shown in FIG. 4, the configuration of element 10 is such as to have an inner profile shaped like a T. Laterally with respect to the stem of the T-shaped element 10 there are provided by means of stamping the symmetrical depressions 10b project inside the cavity 10a and constitute an equal number of support points for the resilient plate 13 when this latter is mounted within cavity 10a. Element 13, as shown in FIG. 7, is further provided with a stop tooth 13c and has the extremity 13d, opposed to extremity 13a, folded in such a way as to be easily operable and capable of effecting the functions hereinafter described.

Housing element 10 is preferably formed from plastic and resilient material and is reinforced by the metallic sheath 15, shaped substantially as a C, so as to render more rigid the connection and to prevent deformations of the plastic element 10. As shown in FIG. 1, the laminar element 13 is mounted internally of element 10 and has the hook 13a engaged with the transverse bridge 14, while the central, straight portion 13 rests on the inner projection provided by the depressions 10b which are nearer the extremity 13a of the spring. By this assembly, the laminar element 13, because of the presence of supports 10b and because of the inclined profile of element 13 itself, assumes a position such as shown in full lines in FIG. 1. By exerting a moderate pressure upon extremity 13d, in the direction indicated by arrow X in FIG. 1, the element 13 is resiliently deformed till it rests upon the stops constituted by the depressions 10b near the entrance of cavity 10a of element 10.

The extremity 11 of the oscillating arm is provided a seat 16 formed by an aperture or by a suitable piercing operation, so that it becomes apt to receive tooth 13c of the spring 13. The dimensional relationships between the extremity 11 and the cavity 10a of element 10 are such that there is substantially no play between the coupled elements of the device.

Retention seat 16 of tooth 13c is, obviously, provided in the low surface of the oscillating arm, that is to say in a position facing the tooth 13c.

By inserting the extremity 11 into cavity 10a of element 10, the spring 13 becomes depressed as shown in dotted lines in FIG. 1. The tooth 13c engages the seat 16 of the extremity of the oscillating arm and makes a strong connection which is not readily detachable without physical effort.

To effect the coupling between the extremity 11 of the oscillating arm and element 10 pivotable on the back support of the wiper, it is necessary to depress the laminar element 13 by exerting on its protruding extremity 13d a slight pressure, as shown by the arrow X in FIG. 1. Thus, the tooth 13c becomes disengaged from seat 16 of the extremity 11 and the latter may be detached longitudinally from cavity 10a.

The main characteristics of the present invention are the result of a perfect connection or coupling between the extremity of the oscillating arm and the back support 10 of the blade due to the configuration of this element 10. The metallic sheath 15 which covers the element 10 lends considerable mechanical strength to element 10 and, at the same time, protects it from the atmospheric adverse elements.

It is understood that the improvement of this invention is susceptible of variances within the skill of the artisan without departing from the scope and spirit of the invention.

I claim:

1. Connection means for coupling the oscillating arm and back support of an automotive windshield wiper, said connection means comprising an elongated, hollow plastic housing including an integral, transverse bridge proximate one end thereof, said bridge having a pair of axially spaced transverse sidewalls and a transverse top wall joining said sidewalls for defining two axially spaced-apart chambers and an elongated, resilient plate having an inverted, U-shaped hook at one end thereof and a tooth intermediate the ends thereof, said hook corresponding in size and shape to said bridge whereby said hook is in engagement with said bridge with one leg of said hook positioned in one of said chambers, said tooth being adapted to releasably engage the oscillating arm.

2. The connection means in accordance with claim 1 wherein said boxlike housing defines a T-shaped cavity in transverse cross section, there being further included stop means in said housing for limiting the deflection of said resilient plate.

3. The connection means in accordance with claim 1 wherein there is further included a metallic reinforcing sheath at least partially enclosing said boxlike housing.

4. The connection means in accordance with claim 3 wherein said sheath is C-shaped in transverse cross section.

* * * * *